US011312230B2

(12) United States Patent
Kirita et al.

(10) Patent No.: US 11,312,230 B2
(45) Date of Patent: Apr. 26, 2022

(54) WORK VEHICLE

(71) Applicant: Hitachi Construction Machinery Co., Ltd., Tokyo (JP)

(72) Inventors: Katsuyuki Kirita, Higashine (JP); Masamichi Tanaka, Higashine (JP); Yuuto Abe, Higashine (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 280 days.

(21) Appl. No.: 16/644,855

(22) PCT Filed: Feb. 15, 2019

(86) PCT No.: PCT/JP2019/005597
§ 371 (c)(1),
(2) Date: Mar. 5, 2020

(87) PCT Pub. No.: WO2019/181307
PCT Pub. Date: Sep. 26, 2019

(65) Prior Publication Data
US 2021/0070166 A1 Mar. 11, 2021

(30) Foreign Application Priority Data
Mar. 23, 2018 (JP) .............................. JP2018-056737

(51) Int. Cl.
*B60K 15/063* (2006.01)
*F02M 37/00* (2006.01)
(Continued)

(52) U.S. Cl.
CPC ............ *B60K 15/063* (2013.01); *B60K 15/03* (2013.01); *E01C 19/26* (2013.01); *E01C 19/28* (2013.01);
(Continued)

(58) Field of Classification Search
CPC .................. B60K 15/03; B60K 15/063; B60K 2015/03118–03157; B60K 2015/03528;
(Continued)

(56) References Cited

U.S. PATENT DOCUMENTS 2,530,819 A * 11/1950 Hamlin .................. B60K 15/00
220/23.83
3,311,183 A * 3/1967 Phillips .................. B62D 49/00
180/54.1
(Continued)

FOREIGN PATENT DOCUMENTS

EP 2826656 A1 * 1/2015 ........... B60K 15/077
GB 842590 A * 7/1960 ............. E01C 19/26
(Continued)

OTHER PUBLICATIONS

International Search Report (PCT/ISA/210) issued in PCT Application No. PCT/JP2019/005597 dated Mar. 26, 2019 with English translation (three (3) pages).
(Continued)

*Primary Examiner* — John M Zaleskas
(74) *Attorney, Agent, or Firm* — Crowell & Moring LLP (57) ABSTRACT

A work vehicle including: a drive device that has an internal combustion engine for driving a vehicle body; a first tank for storing fuel to be supplied to the internal combustion engine; and a second tank for storing fuel to be supplied to the internal combustion engine; wherein the first tank is disposed in front of or behind the drive device, and the second tank is disposed below the drive device so as to be separated from the first tank by a predetermined distance.

4 Claims, 8 Drawing Sheets

(51) Int. Cl.
*E01C 19/28* (2006.01)
*E01C 19/26* (2006.01)
*B60K 15/03* (2006.01)
*B60K 15/035* (2006.01)

(52) U.S. Cl.
CPC ...... *F02M 37/007* (2013.01); *F02M 37/0047* (2013.01); *F02M 37/0052* (2013.01); *F02M 37/0076* (2013.01); *F02M 37/0088* (2013.01); *B60K 2015/03118* (2013.01); *B60K 2015/03125* (2013.01); *B60K 2015/03144* (2013.01); *B60K 2015/03236* (2013.01); *B60K 2015/03528* (2013.01); *B60Y 2200/41* (2013.01); *F02M 37/0082* (2013.01)

(58) Field of Classification Search
CPC ............. F02M 37/0047; F02M 37/007; F02M 37/0076; F02M 37/0088; B60Y 2200/22–225; B60Y 2200/41–417; E01C 19/26–28
See application file for complete search history.

(56) References Cited

U.S. PATENT DOCUMENTS

| | | | | |
|---|---|---|---|---|
| 3,586,363 | A * | 6/1971 | Omlid | B60K 15/00 280/834 |
| 4,288,086 | A * | 9/1981 | Oban | B60K 15/063 137/571 |
| 4,664,144 | A * | 5/1987 | Lemmon | B60K 15/077 137/44 |
| 4,852,892 | A * | 8/1989 | Reid | B60K 15/073 280/834 |
| 5,658,013 | A * | 8/1997 | Bees | B60K 15/03 280/831 |
| 5,983,932 | A * | 11/1999 | Wagner | B60K 15/03 123/509 |
| 6,550,811 | B1 * | 4/2003 | Bennett | B60K 15/03 180/314 |
| 2002/0148510 | A1 | 10/2002 | Viebahn et al. | |
| 2005/0087236 | A1 * | 4/2005 | Woo | B60K 15/03 137/572 |
| 2006/0033322 | A1 * | 2/2006 | Suess | B60K 15/07 280/830 |
| 2007/0163660 | A1 * | 7/2007 | Mowatt | B60K 15/06 137/572 |
| 2008/0000916 | A1 * | 1/2008 | Hwang | E02F 9/00 220/562 |
| 2009/0178653 | A1 | 7/2009 | Suda et al. | |
| 2012/0139225 | A1 * | 6/2012 | Sonderegger | B60K 15/03 280/834 |
| 2013/0305717 | A1 * | 11/2013 | Roehr | E01C 19/282 60/605.2 |
| 2015/0114363 | A1 * | 4/2015 | Voss | B60K 15/03 123/541 |
| 2015/0191896 | A1 * | 7/2015 | Voss | B60K 15/063 137/1 |
| 2015/0217634 | A1 | 8/2015 | Sawai et al. | |
| 2015/0260626 | A1 * | 9/2015 | Frelich | G01N 9/002 404/84.05 |
| 2015/0345352 | A1 | 12/2015 | Mitobe et al. | |
| 2016/0089974 | A1 * | 3/2016 | Tanigawa | B62D 49/00 280/834 |
| 2016/0176278 | A1 * | 6/2016 | Bletscher | E01C 19/266 180/291 |
| 2017/0036536 | A1 * | 2/2017 | Green | F02M 37/0011 |
| 2017/0113543 | A1 * | 4/2017 | Pelarski | B60K 13/04 |
| 2017/0144536 | A1 * | 5/2017 | Kim | F02M 25/0854 |
| 2018/0038075 | A1 * | 2/2018 | Yamada | F15B 11/08 |
| 2018/0044886 | A1 * | 2/2018 | Namai | E02F 9/0833 |
| 2021/0070168 | A1 * | 3/2021 | Kirita | E01C 19/26 |
| 2021/0252970 | A1 * | 8/2021 | Kirita | B60K 15/04 |

FOREIGN PATENT DOCUMENTS

| | | | | |
|---|---|---|---|---|
| JP | 61287822 A | * | 12/1986 | ............. B60K 15/03 |
| JP | 7-76231 A | | 3/1995 | |
| JP | 10035299 A | * | 2/1998 | .......... F02M 37/007 |
| JP | 10-67214 A | | 3/1998 | |
| JP | 11-245677 A | | 9/1999 | |
| JP | 2000-142127 A | | 5/2000 | |
| JP | 2000-192507 A | | 7/2000 | |
| JP | 2001-12326 A | | 1/2001 | |
| JP | 2002-59750 A | | 2/2002 | |
| JP | 2006027316 A | * | 2/2006 | |
| JP | 2006-169853 A | | 6/2006 | |
| JP | 2006-341719 A | | 12/2006 | |
| JP | 2008025207 A | * | 2/2008 | |
| JP | 2014145201 A | * | 8/2014 | |
| JP | 2017136875 A | * | 8/2017 | |
| JP | 2018019625 A | * | 2/2018 | ............. A01D 67/00 |
| KR | 20020084549 A | * | 11/2002 | |

OTHER PUBLICATIONS

Japanese-language Written Opinion (PCT/ISA/237) issued in PCT Application No. PCT/JP2019/005597 dated Mar. 26, 2019 (three (3) pages).
International Search Report (PCT/ISA/210) issued in PCT Application No. PCT/JP2019/005596 dated Mar. 26, 2019 with English translation (four (4) pages).
Japanese-language Written Opinion (PCT/ISA/237) issued in PCT Application No. PCT/JP2019/005596 dated Mar. 26, 2019 (three (3) pages).

* cited by examiner

WORK VEHICLE

TECHNICAL FIELD

The present invention relates to a work vehicle, and particularly to a technology for improving maintainability when a drive device mounted on a work vehicle is maintained from below a vehicle body.

BACKGROUND ART

Generally, in road pavement work, a so-called earthwork vibration roller is used in order to equalize flatness of the ground before construction of asphalt.

In this earthwork vibration roller, an operator often maintains an engine and the like from above a vehicle body, and therefore a fuel tank for storing fuel supplied to the engine is generally disposed below a drive device.

However, the operator sometimes desirably maintains the drive device such as the engine from below the vehicle body more than from above the vehicle body.

A technology capable of easily maintaining a drive device from below a vehicle body by an operator by easily detaching a fuel tank from below the vehicle body is developed (Patent Document 1).

PRIOR ART DOCUMENT

Patent Document

Patent Document 1: Japanese Patent Laid-Open No. 2006-169853

SUMMARY OF THE INVENTION

Problems to be Solved by the Invention

However, in the technology disclosed in the aforementioned Patent Document 1, when the fuel tank is not detached, the operator cannot maintain the drive device such as the engine from below the vehicle body, and therefore there is room for further improvement.

The present invention has been made in view of such a problem, and an object of the present invention is to provide a work vehicle capable of improving maintainability when a drive device mounted on the work vehicle is maintained from below a vehicle body.

Means for Solving the Problems

In order to achieve the above object, a rolling machine of the present invention includes: a drive device that has an internal combustion engine for driving a vehicle body; a first tank for storing fuel to be supplied to the internal combustion engine; and a second tank for storing fuel to be supplied to the internal combustion engine, wherein the first tank is disposed in front of or behind the drive device, and the second tank is disposed below the drive device so as to be separated from the first tank by a predetermined distance.

Advantageous Effects of the Invention

According to a work vehicle of the present invention, it is possible to improve maintainability when a drive device mounted on a work vehicle is maintained from below a vehicle body.

MODE FOR CARRYING OUT THE INVENTION

First Embodiment

Hereinafter, a first embodiment of the present invention will be described with reference to the drawings.

Figure 1:
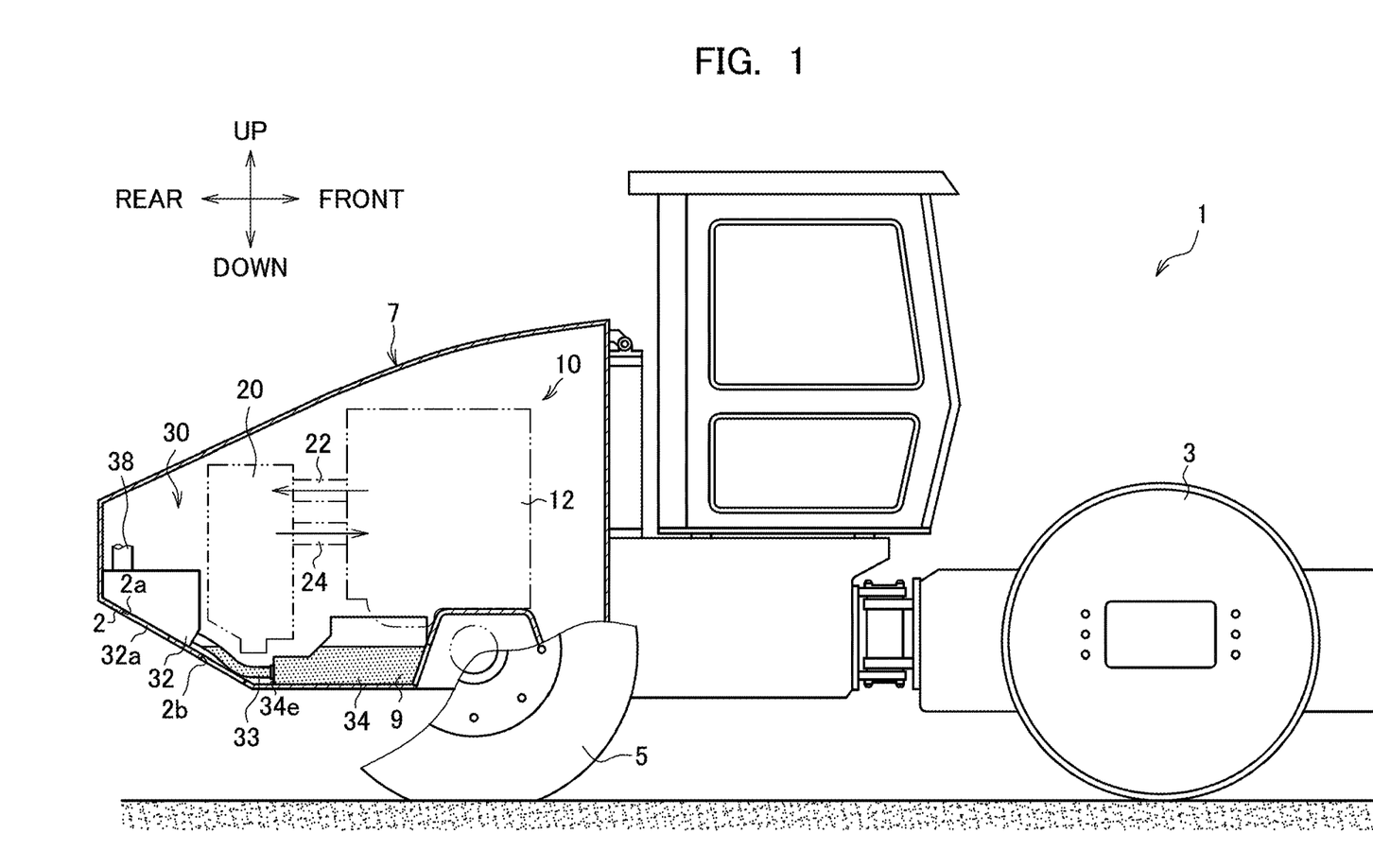
FIG. 1 is a schematic configuration diagram of a vehicle body mounted with a fuel tank unit according to a first embodiment.

Referring to FIG. 1, a schematic configuration diagram of a vehicle body 1 of a rolling machine (work vehicle) according to the first embodiment is illustrated. The vehicle body 1 is a so-called earthwork vibration roller having front wheels 3 which are iron wheels, and capable of compacting the ground before construction of asphalt by vibrating the front wheels 3 by an eccentric weight (not illustrated) provided in the front wheels 3 while moving forward and rearward the vehicle body 1 by driving rubber rear wheels 5, for example. This vehicle body 1 is mounted with a drive device 10 and a fuel tank unit 30.

The drive device 10 includes an engine (internal combustion engine) 12 and a cooling device 20. The engine 12 is an internal combustion engine that burns fuel 9 supplied from the fuel tank unit 30 to generate driving force, and is mounted on the front side with respect to the center of an engine room 7 provided in a rear part in the front-rear direction of the vehicle body 1. That is, the drive device 10 can move forward and rearward the vehicle body 1 by driving the front wheels 3 and the rear wheels 5 by using the driving force operated and generated by the engine 12. The cooling device 20 is a so-called heat exchanger provided on the rear side in the front-rear direction of the vehicle body 1 with respect to the engine 12.

The cooling device 20 is connected to the engine 12 by a high-temperature pipe 22 and a low-temperature pipe 24 so as to enable cooling water to flow. More specifically, cooling water that flows through a water jacket (not illustrated) provided in the engine 12 is heated by heat generated by operation of the engine 12, and the high-temperature cooling water flows through the cooling device 20 through the high-temperature pipe 22. This high-temperature cooling water is cooled by the cooling device 20 to flows through the engine 12 through the low-temperature pipe 24. Consequently, in the engine 12, excessive rise of the internal temperature is suppressed.

Figure 2:
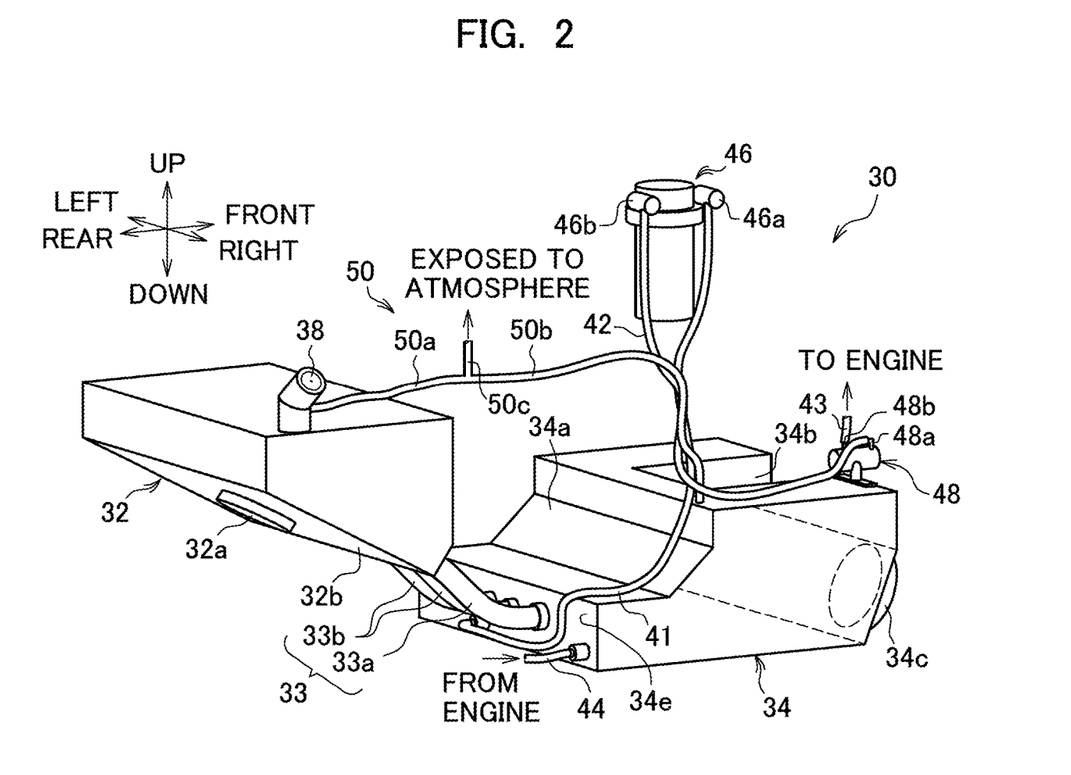
FIG. 2 is a perspective view of a fuel tank unit viewed from the obliquely right rear side of the vehicle body according to the first embodiment.
Figure 3:
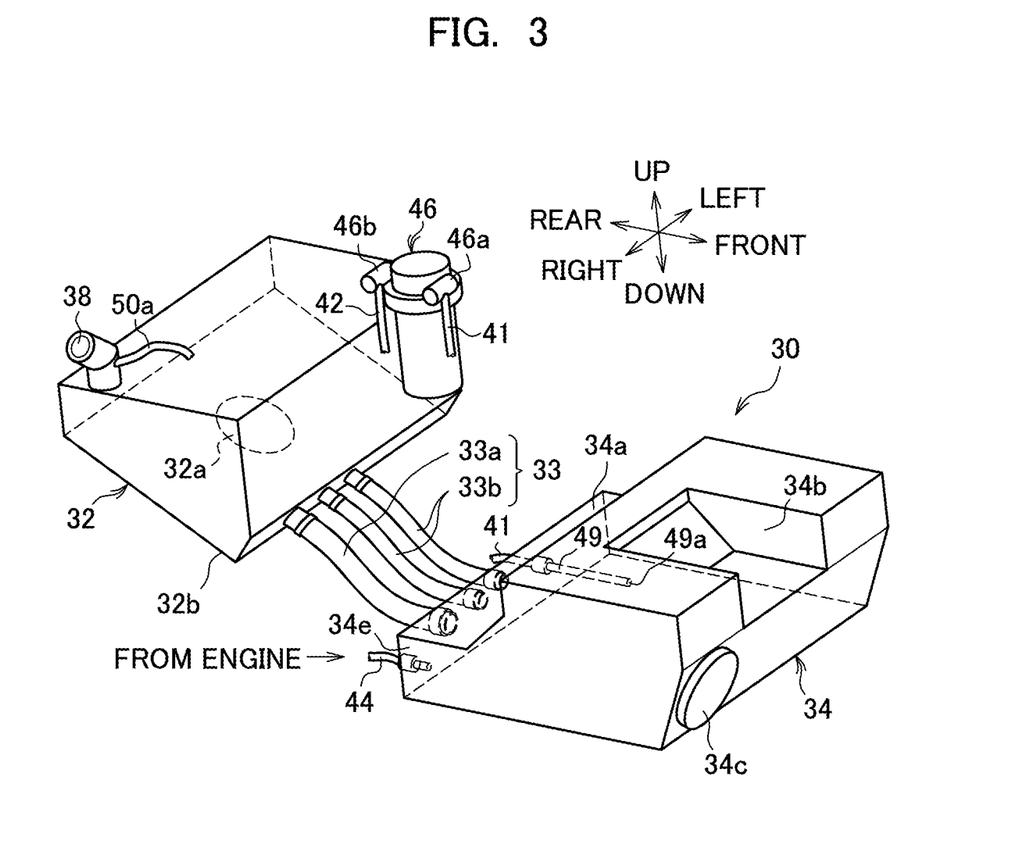
FIG. 3 is a perspective view of the fuel tank unit viewed from the obliquely right front side of the vehicle body according to the first embodiment.

Referring to FIG. 2, a perspective view of the fuel tank unit 30 viewed from the obliquely right rear side of the vehicle body 1 according to the first embodiment is illustrated. Referring to FIG. 3, a perspective view of the fuel tank unit 30 viewed from the obliquely right front side of the vehicle body 1 according to the first embodiment is illustrated.

The fuel tank unit 30 includes a first tank 32, a second tank 34, a piping member 33, a filter device 46, a pump 48, and a breather unit 50.

The first tank 32 is a tank disposed behind the drive device 10, and capable of storing the fuel 9. An oil filling port 38 for supplying the fuel 9 to the first tank 32 is provided on the right in the right-left direction of the vehicle body 1 at the upper part of this first tank 32. A lower surface 32b of the first tank 32 is formed in a shape inclined at a predetermined angle so as to lower toward the front direction of the vehicle body 1 from a rear end to a front end.

A first cleaning window 32a is provided in the lower surface 32b of the first tank 32. The first cleaning window 32a is a window for cleaning the first tank 32 when an operator wrongly supplies liquid medicine other than the fuel 9 such as a reducing agent from the oil filling port 38 to the first tank 32, for example, the window being openable from a first opening 2a provided in a lower panel 2 disposed below the first tank 32 and the second tank 34.

The second tank 34 is a tank disposed below the drive device 10 so as to be separated from the first tank 32 by a predetermined distance, and capable of storing the fuel 9. In the second tank 34, a recess 34a for avoiding interference with the cooling device 20 is formed in a rear upper part, and a groove 34b for avoiding interference with the engine 12 is formed at a center in the right-left direction in a front upper part. Furthermore, a second cleaning window 34c is provided in a front end of the second tank 34. This second cleaning window 34c is a window for cleaning the second tank 34 similarly to the first cleaning window 32a.

A first tube 41 and a fourth tube 44 are connected to the second tank 34. The fourth tube 44 has a first end connected to a rear end surface 34e of the second tank 34 so as to be able to supply the fuel 9, and a second end connected to the engine 12. The first tube 41 is connected to a sucking-out part 49 described below, and has a second end connected to the filter device 46 so as to enable the fuel 9 to flow.

The filter device 46 is a filter capable of purifying the fuel 9 by removing fine dust or the like included in the fuel 9. In the filter device 46, the second end of the first tube 41 is connected to an introduction part 46a so as to enable the fuel 9 to flow, and a first end of a second tube 42 is connected to a discharge part 46b as to enable the fuel 9 to flow.

The second tube 42 has the first end connected to the discharge part 46b of the filter device 46 so as to enable the fuel 9 to flow, and a second end connected to an introduction part 48a of the pump 48 so as to enable the fuel 9 to flow. The pump 48 is, for example, a trochoid type pump, sucks the fuel 9 from the second tube 42 through the introduction part 48a, and discharges the fuel 9 to a third tube 43 having a first end connected so as to enable the fuel 9 to flow from a discharge part 48b.

The third tube 43 has the first end connected to the discharge part 48b of the pump 48 so as to enable the fuel 9 to flow, and a second end connected to the engine 12 so as to enable the fuel 9 to flow. Thus, the fuel 9 stored in the second tank 34 is introduced in the filter device 46 through the first tube 41 to be purified, and thereafter is sucked in the pump 48 through the second tube 42, and is supplied to the engine 12 through the third tube 43.

The engine 12 operates by burning the fuel 9 supplied as described above. At this time, the fuel 9 that is not used for combustion and remains, out of the fuel 9 supplied to the engine 12, returns to the second tank 34 through the fourth tube 44.

The first tube 41 is connected so as to be able to supply the fuel 9 to the sucking-out part (supply member) 49 provided to penetrate the rear end surface 34e of the second tank 34. This sucking-out part 49 is a hollow tubular member extending to the front side of the vehicle body 1 from the rear end surface 34e, in other words, in the direction away from the first tank 32, and is provided with an opening (supply opening) 49a at an end on the front side.

The first tank 32 and the second tank 34 are connected through the piping member 33 so as to enable the fuel 9 to flow. The piping member 33 includes a first pipe 33a and second pipes 33b. The first pipe 33a is a flexible pipe having a first end connected to the first tank 32 so as to enable the fuel 9 to flow, and a second end connected to the second tank 34 so as to enable the fuel 9 to flow.

Each of the second pipes 33b is a flexible pipe that has a first end connected to the first tank 32 so as to enable the fuel 9 to flow, and a second end connected to the second tank 34 so as to enable the fuel 9 to flow, and that is thinner than the first pipe 33a. The two second pipes 33b are disposed at positions further separated from the oil filling port 38 than the first pipe 33a.

In other words, the first pipe 33a has a larger inner diameter than the second pipes 33b, and therefore a circulation possible amount of the fuel 9 per predetermined time can be increased compared to the second pipes 33b. Consequently, the first pipe 33a is closer to the oil filling port 38 than the second pipes 33b, and therefore the fuel 9 replenished from the oil filling port 38 can be satisfactorily replenished to the second tank 34.

Figure 4:
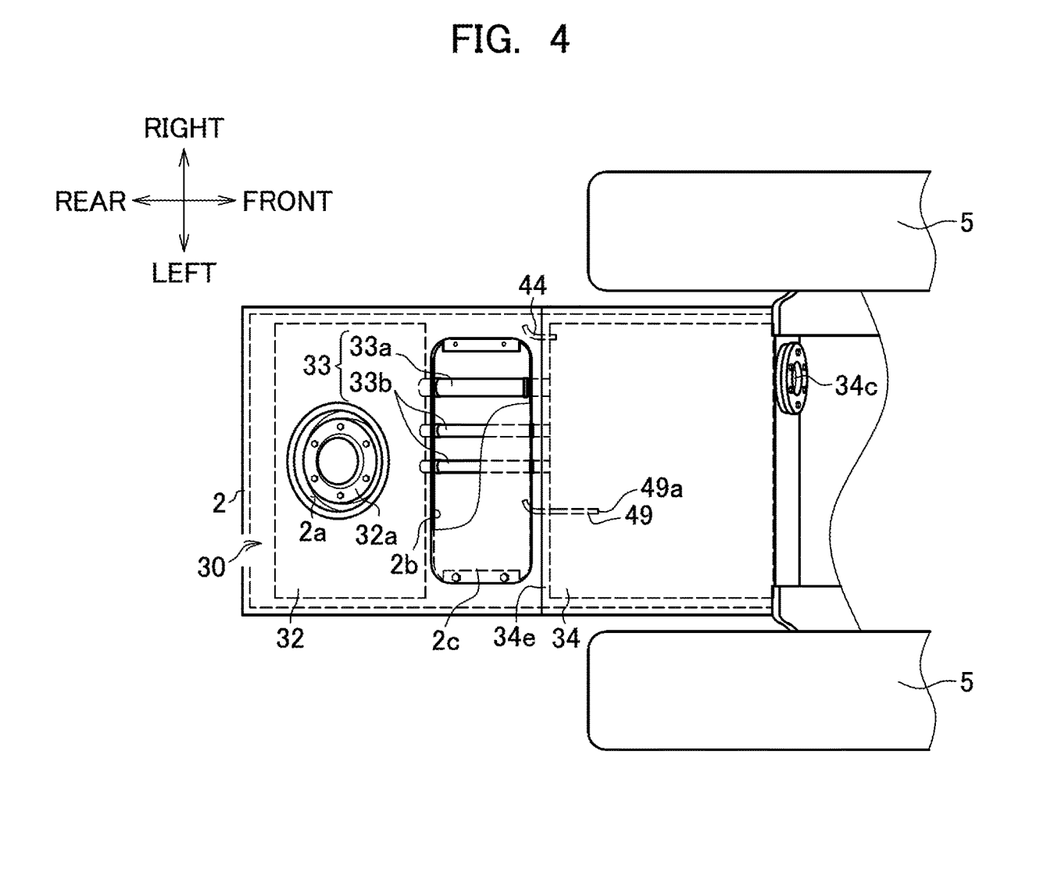
FIG. 4 is a bottom view of a vehicle body rear part according to the first embodiment.

Referring to FIG. 4, a bottom view of a rear part of the vehicle body 1 according to the first embodiment is illustrated. A second opening (opening) 2b is provided at a position corresponding a portion between the first tank 32 and the second tank 34 in the lower panel 2. Consequently, an operator can perform maintenance of the drive device 10 of the cooling device 20 from below the vehicle body 1.

A protective plate (protective member) 2c is a plate member formed in a shape corresponding to an inner peripheral edge of the second opening 2b. This protective plate 2c is detachably mounted on the lower panel 2 by, for example, bolts so as to close the second opening 2b. That is, in other cases except maintenance or the like, in the lower panel 2, the second opening 2b is closed by the protective plate 2c. The protective plate 2c is detachably mounted, so that an operator can detach the protective plate 2c from the lower panel 2 to perform maintenance of a lower part of the drive device 10 from below the vehicle body 1.

Returning to FIG. 2, the breather unit 50 is connected to the first tank 32 and the second tank 34. The breather unit 50 includes a first breather hose 50a, a second breather hose 50b, and a third breather hose 50c. The first breather hose 50a has a first end connected to the oil filling port 38 provided in an upper part of the first tank 32 so as to enable ventilation, and has a second end connected to a lower end of the third breather hose 50c so as to enable ventilation.

The second breather hose 50b has a first end connected to an upper end of the second tank 34 so as to enable ventilation, and a second end connected to the lower end of the third breather hose 50c so as to enable ventilation. The third breather hose 50c has the lower end connected to the first breather hose 50a and the second breather hose 50b so as to enable ventilation, and an upper end connected to a canister (not illustrated) so as to enable ventilation.

Pressure is sometimes generated in the upper part of the first tank 32 and an upper part of the second tank 34 by volatilization of the stored fuel 9. That is, the canister is connected to the upper end of the third breather hose 50c, so that the pressure generated in each of the upper parts of the first tank 32 and the second tank 34 can be opened to the atmosphere after the volatilized fuel 9 is extracted.

In the breather unit 50, the second end of the first breather hose 50a and the second end of the second breather hose 50b are connected to each other so as to enable ventilation. That is, the first breather hose 50a and the second breather hose 50b are connected to each other so as to enable ventilation, so that the breather unit 50 can lower the pressure while uniformizing the pressure generated in the first tank 32 and the pressure generated in the second tank 34. Therefore, when the fuel 9 flows through the first tank 32 and the second tank 34, for example, when the vehicle body 1 inclines such that the front part of the vehicle body 1 lowers and rises, the atmospheric pressure in the first tank 32 and the atmospheric pressure in the second tank 34 are uniformized, so that the fuel 9 can satisfactorily flow.

As described above, the vehicle body 1 according to the first embodiment includes the drive device 10 that has the engine 12 for driving the vehicle body 1, the first tank 32 for storing the fuel 9 to be supplied to the engine 12, and the second tank 34 for storing the fuel 9 to be supplied to the engine 12, the first tank 32 is disposed behind the drive device 10, and the second tank 34 is disposed below the drive device 10 so as to be separated from the first tank 32 by the predetermined distance.

Accordingly, the second tank 34 is disposed below the drive device 10 so as to be separated from the first tank 32 disposed behind the drive device 10 by the predetermined distance, and therefore it is possible to maintain the drive device 10 from between the first tank 32 and the second tank 34.

The fuel 9 is divided to be stored in the first tank 32 and the second tank 34, so that the first tank 32 and the second tank 34 are mounted by using a clearance in the engine room 7, so that it is possible to increase a possible amount of the fuel 9 to be replenished to the vehicle body 1.

Particularly, the vehicle body includes the piping member 33 having the first end connected to the first tank 32 so as to enable the fuel 9 to flow, the second end connected to the second tank 34 so as to enable the fuel 9 to flow, so that the fuel 9 can be replenished to one of either the first tank 32 or the second tank 34, and the fuel 9 can be stored in the other of either the first tank 32 or the second tank 34.

The vehicle body includes the lower panel 2 disposed below the first tank 32 and the second tank 34, and provided with the second opening 2b at the position corresponding to the portion between the first tank 32 and the second tank 34, and the detachable protective plate 2c mounted on the lower panel 2 to close the second opening 2b.

Therefore, the vehicle body includes the lower panel 2 below the first tank 32 and the second tank 34, is provided with the second opening 2b at the position corresponding to the portion between the first tank 32 and the second tank 34 in the lower panel 2, and further includes the protective plate 2c detachably, and therefore the lower parts of the first tank 32 and the second tank 34 can be protected by the lower panel 2, the drive device 10 can be maintained from the position corresponding to the portion between the first tank 32 and the second tank 34 by the second opening 2b, and the second opening 2b is closed by the protective plate 2c in other cases except maintenance or the like, so that the drive device 10 can be prevented from being damaged by gravel or the like entering from the second opening 2b.

The vehicle body includes the first breather hose 50a having the first end connected to the upper part of the first tank 32 so as to enable ventilation, and the second breather hose 50b having the first end connected to the upper part of the second tank 34 so as to enable ventilation, and the respective second ends of the first breather hose 50a and the second breather hose 50b are connected to each other so as to enable ventilation, and therefore it is possible to uniformize the pressure in the first tank 32 and the pressure in the second tank 34.

Second Embodiment

Hereinafter, a second embodiment will be described with reference to FIGS. 5 to 8.

Description of a configuration common with the configuration of the aforementioned first embodiment will be omitted, and different portions from the first embodiment will be herein described.

Figure 5:
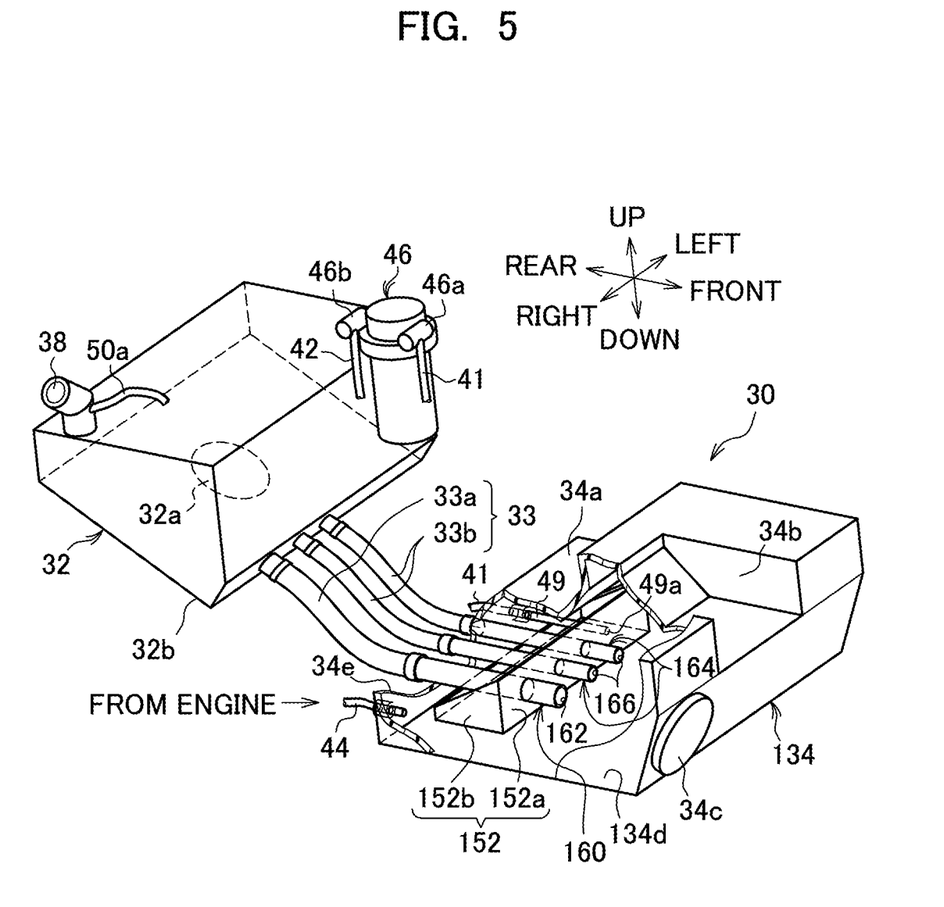
FIG. 5 is a perspective view of a fuel tank unit viewed from the obliquely right front side of a vehicle body according to a second embodiment.

Referring to FIG. 5, a perspective view of a fuel tank unit 30 viewed from the obliquely right front side of a vehicle body 1 according to the second embodiment is illustrated.

A second tank 134 of the fuel tank unit 30 according to the second embodiment includes a fuel retaining member 152, a first tubular member (hollow tube member) 160, and a second tubular member (hollow tube member) 164.

The fuel retaining member 152 includes a front wall 152a and side walls 152b. The front wall 152a is formed to extend upward from a bottom 134d of the second tank 134 such that an upper end is disposed above an opening 49a of a sucking-out part 49.

The two side walls 152b are formed so as to extend upward from the bottom 134d of the second tank 134 similarly to the front wall 152a, have upper ends formed to be inclined to the bottom 134d side from an upper end of the front wall 152a toward the rear side in the front-rear direction of the vehicle body 1, and are disposed at right and left ends of the front wall 152a. That is, the front wall 152a and the side walls 152b are disposed so as to surround the front side and the sides in the right-left direction of the opening 49a.

The first tubular member 160 has a first end opened on a rear end surface 34e so as to enable the fuel 9 to flow with a first pipe 33a of a piping member 33. Additionally, the first tubular member 160 is a hollow tubular member having a second end extending in the direction away from the first tank to penetrate the front wall 152a of the fuel retaining member 152. An opening (hollow tube opening) 162 opened so as to enable the fuel 9 to flow through the second tank 134 is provided in the second end of this first tubular member 160. This opening 162 is provided at a position separated from the first tank 32 with respect to the opening 49a of the sucking-out part 49.

Similarly to the first tubular member 160, each first end of the second tubular members 164 is provided on the rear end surface 34e so as to enable the fuel 9 to flow from a second pipe 33b of the piping member 33. Additionally, each second tubular member 164 is a hollow tubular member having a second end extending in the direction away from the first tank 32 to penetrate the front wall 152a of the fuel retaining member 152, and having a smaller diameter than the first tubular member 160.

An opening (hollow tube opening) 166 opened so as to enable the fuel 9 to flow through the second tank 134 is provided on the second end of each second tubular member 164. This opening 166 is provided at a position separated from the first tank 32 with respect to the opening 49a of the sucking-out part 49. The two second tubular members 164 are disposed side by side on the left of the vehicle body 1 that is the direction away from the oil filling port 38 compared to the first tubular member 160.

In other words, the first tubular member 160 has a larger inner diameter than the second tubular members 164, and therefore a circulation possible amount of the fuel 9 per predetermined time can be increased compared to the second tubular members 164. Additionally, the first tubular member 160 is closer to the oil filling port 38 than the second tubular members 164, and therefore the fuel 9 replenished from the oil filling port 38 can be satisfactorily replenished to the second tank 134.

Figure 6:
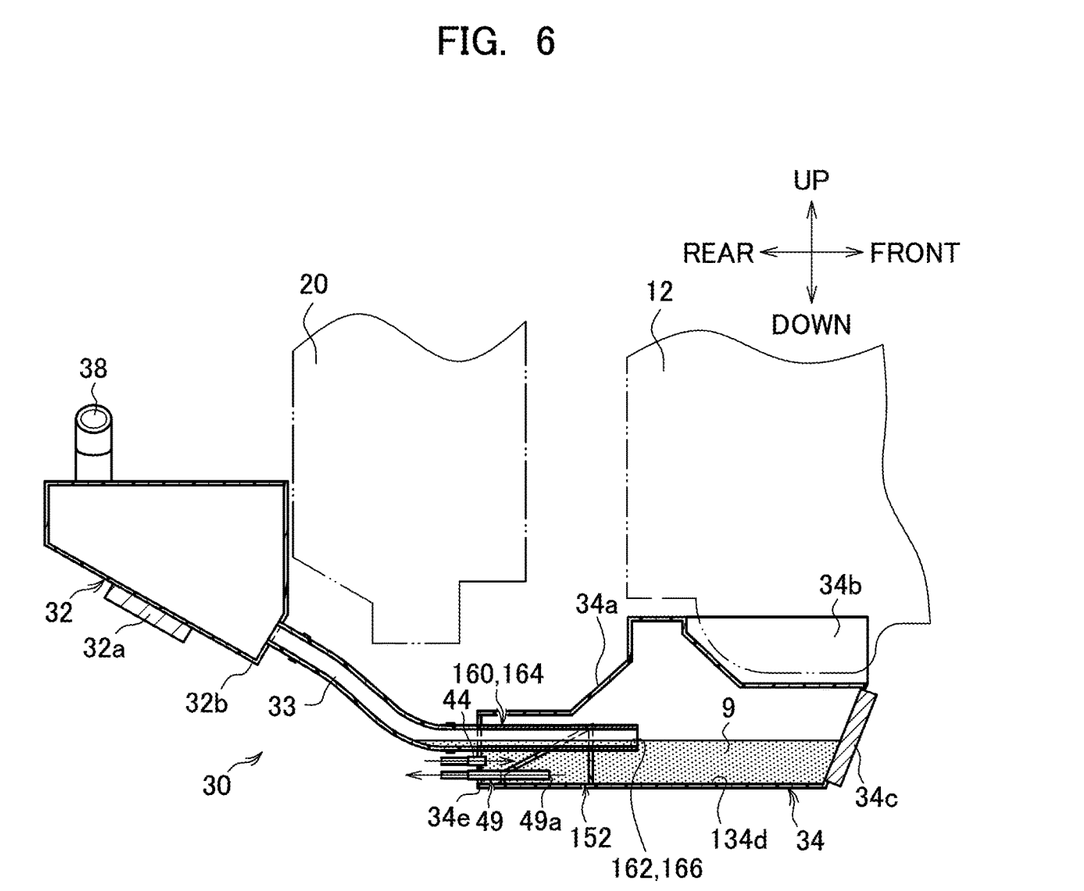
FIG. 6 is an explanatory diagram illustrating a state of fuel when the vehicle body according to the second embodiment is located on a flat ground.

Referring to FIG. 6, an explanatory diagram illustrating a state of the fuel 9 when the vehicle body 1 according to the second embodiment is located on a flat ground is illustrated.

When the fuel 9 is supplied from the oil filling port 38 to the first tank 32 of the fuel tank unit 30, the fuel 9 is supplied to the second tank 134 through the piping member 33, the first tubular member 160 and the second tubular members 164. More specifically, the fuel 9 supplied to the first tank 32 flows downward along the lower surface 32b by gravity, and passes through the piping member 33 to reach the rear end surface 34e. The first tubular member 160 and the second tubular members 164 are provided in the rear end surface 34e so as to enable the fuel 9 to flow, and therefore the fuel 9 passes through the first tubular member 160 and the second tubular members 164 to be supplied to the second tank 134.

Figure 7:
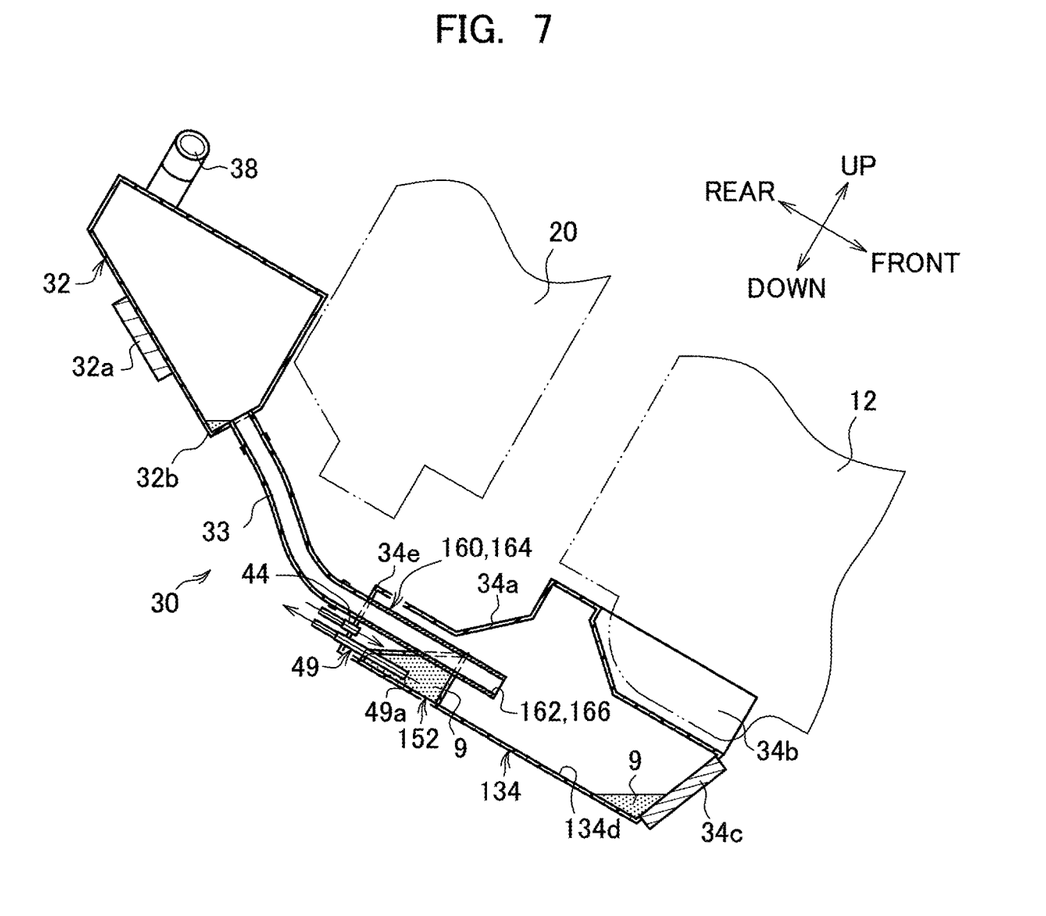
FIG. 7 is an explanatory diagram illustrating a state of fuel when the vehicle body according to the second embodiment is inclined at a predetermined angle such that a front part of the vehicle body lowers.

Referring to FIG. 7, an explanatory diagram illustrating a state of the fuel 9 when the vehicle body 1 according to the second embodiment is inclined at a predetermined angle such that a front part of the vehicle body 1 lowers is illustrated.

When the vehicle body 1 is inclined at the predetermined angle such that the front part of the vehicle body 1 lowers, the fuel 9 is biased to be stored on the side separated from the first tank 32 of the second tank 134, and in the fuel retaining member 152.

More specifically, the fuel 9 stored in the first tank 32 flows in the direction away from the first tank 32 of the second tank 134 through the piping member 33, the first tubular member 160 and the second tubular members 164 by gravity. On the other hand, a part of the fuel 9 stored in the second tank 134 is prevented from flowing toward the side separated from the first tank 32 of the second tank 134 by the fuel retaining member 152, and is stored in the fuel retaining member 152.

Consequently, in the fuel tank unit 30, when the vehicle body 1 is inclined at the predetermined angle such that the front part of the vehicle body 1 lowers, the fuel 9 is stored in the fuel retaining member 152, so that the fuel 9 can be supplied to the engine 12 from the sucking-out part 49 through the filter device 46 and the pump 48.

Figure 8:
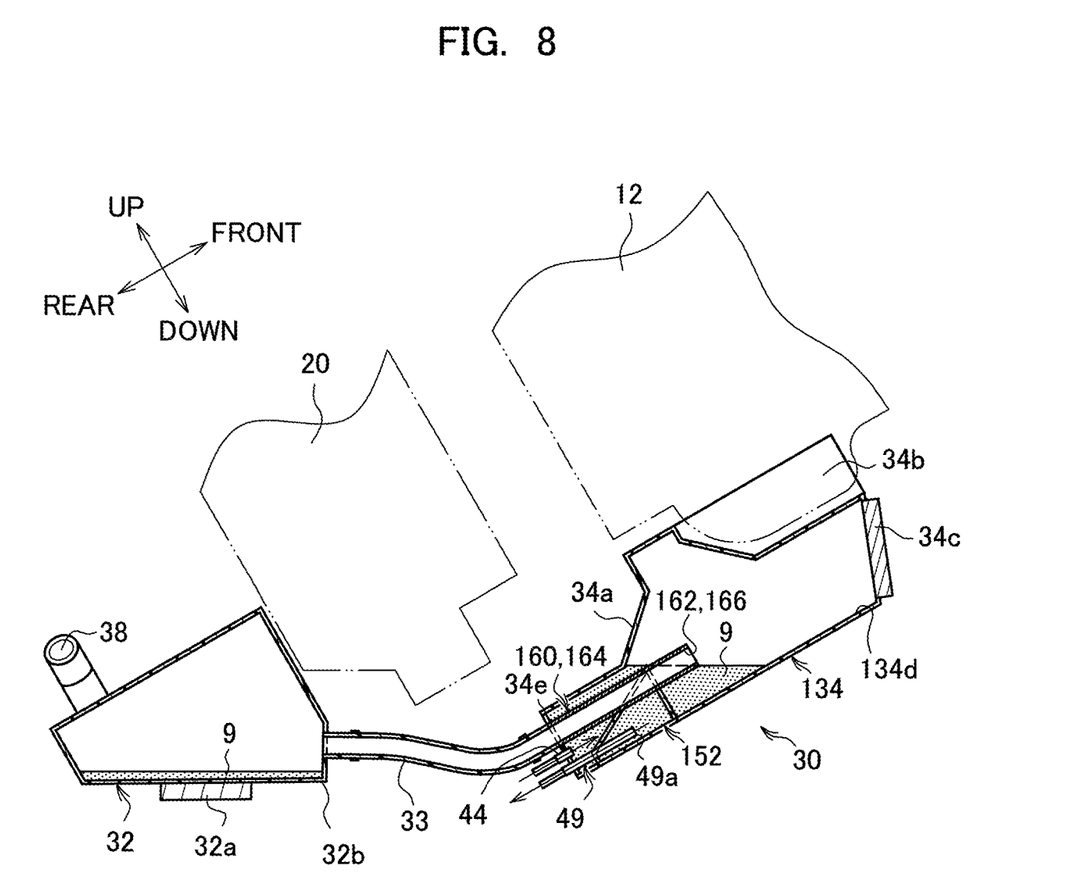
FIG. 8 is an explanatory diagram illustrating a state of fuel when the vehicle body according to the second embodiment is inclined at a predetermined angle such that the front part of the vehicle body rises.

Referring to FIG. 8, an explanatory diagram illustrating a state of the fuel 9 when the vehicle body 1 according to the second embodiment is inclined at a predetermined angle such that the front part of the vehicle body 1 rises is illustrated.

When the vehicle body 1 is inclined at the predetermined angle such that the front part of the vehicle body 1 rises, the fuel 9 is biased to be stored near the lower surface 32b of the first tank 32, and on the side close to the first tank 32 of the second tank 134.

More specifically, the fuel 9 stored in the second tank 134 flows toward the first tank 32 through the first tubular member 160, the second tubular members 164, and the first pipe 33a and the second pipes 33b of the piping member 33 by gravity. At this time, the first tubular member 160 and the second tubular members 164 extend toward the front side of the vehicle body 1 from the rear end surface 34e, and the opening 162 and the openings 166 are provided at positions further separated from the first tank than the opening 49a of the sucking-out part 49, so that the fuel 9 below the opening 162 and the openings 166 as viewed in the gravity direction, out of the fuel 9 stored in the second tank 134, is biased to be stored on the side close to the first tank 32 of the second tank 134 without flowing in the first tank 32.

Thus, in the fuel tank unit 30, the first tubular member 160 and the second tubular members 164 extend toward the front side of the vehicle body 1 from the rear end surface 34e, so that when the vehicle body 1 is inclined at the predetermined angle such that the front part of the vehicle body 1 rises, the fuel 9 can be stored on the side separated from the first tank 32 of the second tank 134, and therefore it is possible to supply the fuel 9 from the sucking-out part 49 to the engine 12 through the filter device 46 and the pump 48.

The first end of the fourth tube 44 is connected to the second tank 134 from the rear end surface 34e, so that the fuel 9 that is not used for combustion in the engine 12 and remains returns to the second tank 134 through the fourth tube 44, and therefore even when the vehicle body 1 is inclined at the predetermined angle such that the front part of the vehicle body 1 rises, it is possible to store the fuel 9 on the side separated from the first tank 32 of the second tank 134.

With such a configuration, even in any of the state in which the vehicle body 1 is disposed on the flat ground, the state in which the vehicle body 1 is inclined at the predetermined angle such that the front part lowers, and the state in which the vehicle body 1 is inclined at the predetermined angle such that the front part rises, the fuel tank unit 30 according to the second embodiment can supply the fuel 9 to the engine 12.

As described above, the vehicle body 1 according to the second embodiment includes: the sucking-out part 49 that has the first end with the opening 49a opened on the second tank 134, and supplies the fuel 9 stored in the second tank 134 from the second tank 134 to the engine 12; and the first tubular member 160 and the second tubular members 164 having the first ends each provided in the second end of the piping member 33, and the first tubular member 160 and the second tubular members 164 have the second ends extending in the direction away from the first tank 32, and are provided with the opening 162 and the openings 166 opened so as to enable the fuel 9 to flow through the second tank 134 at the positions further separated from the first tank 32 than the opening 49a.

Therefore, the first tubular member 160 and the second tubular members 164 that have the first ends opened and provided on the piping member 33, and have the opening 162 and the openings 166 at the positions further separated from the first tank 32 than the opening 49a in the second end extending in the direction away from the first tank 32 are provided in the second tank 134. Therefore, for example, when the vehicle body 1 is inclined at the predetermined angle such that the first tank 32 lowers in the gravity direction, even in a case where the fuel 9 is biased to the side close to the first tank 32 of the second tank 134, the fuel 9 stored in the second tank 134 is stored on the lower side in the gravity direction with respect to the opening 162 provided on the second end of the first tubular member 160 and the openings 166, and therefore the fuel 9 can be supplied to the engine 12 from the second tank 134 through the opening 49a of the sucking-out part 49 regardless of the inclination angle of the vehicle body 1.

The description of the rolling machine according to the present invention will be finished. The present invention is not limited to the aforementioned embodiments, and can be changed without departing from the spirit of the invention.

For example, the work vehicle is described as an earthwork vibration roller which is one of rolling machines in the embodiments, but the work vehicle may be a so-called tire roller that compacts asphalt before solidification.

In this embodiment, the sucking-out part 49 is provided in the second tank 34, and the fuel 9 is sucked out only from the second tank 34. However, a sucking-out part may be similarly provided also in the first tank 32, and suck out the fuel 9 also from the first tank 32.

In this embodiment, the piping member 33 includes the first pipe 33a and the second pipes 33b. However, the number of pipes composing the piping member 33 may be one, or may be four or more.

In this embodiment, the oil filling port 38 is provided in the upper part of the first tank 32, but may be provided in an upper part of the second tank 34, 134. In this case, an upper end of the oil filling port 38 is desirably located above an upper end of the first tank 32.

Aspects of Present Invention

A work vehicle according to a first aspect of the present invention includes: a drive device that has an internal combustion engine for driving a vehicle body; a first tank for storing fuel to be supplied to the internal combustion engine; and a second tank for storing fuel to be supplied to the internal combustion engine, wherein the first tank is disposed in front of or behind the drive device, and the second tank is disposed below the drive device so as to be separated from the first tank by a predetermined distance.

In the first embodiment of the present invention, the second tank is disposed below the drive device so as to be separated from the first tank disposed in front of or behind the drive device by the predetermined distance, so that it is possible to maintain the drive device from between the first tank and the second tank.

From the above, in the first aspect, it is possible to improve maintainability when the drive device mounted on the work vehicle is maintained from below the vehicle body.

A work vehicle according to a second aspect of the present invention includes a piping member having a first end connected to the first tank so as to enable the fuel to flow, and a second end connected to the second tank so as to enable the fuel to flow. Consequently, the piping member is connected to the first tank and the second tank so as to enable the fuel to flow, so that the fuel can be replenished to one of either the first tank or the second tank, and the fuel can be stored in the other of either the first tank or the second tank.

A work vehicle according to a third aspect of the present invention includes: a lower panel disposed below the first tank and the second tank, and provided with an opening at a position corresponding to a portion between the first tank and the second tank; and a detachable protective member mounted on the lower panel to close the opening. Consequently, the lower panel is provided below the first tank and the second tank, the opening is provided at the position corresponding to the portion between the first tank and the second tank in the lower panel, and the protective member is further provided on the opening detachably, so that the lower parts of the first tank and the second tank can be protected by the lower panel, the drive device can be maintained from the position corresponding to the portion between the first tank and the second tank by the opening, and the opening is closed by the protective member in other cases except maintenance or the like, so that the drive device can be prevented from being damaged by gravel or the like entering from the opening.

A work vehicle according to a fourth aspect of the present invention includes: a first breather hose having a first end connected to an upper part of the first tank so as to enable ventilation; and a second breather hose having a first end connected to an upper part of the second tank so as to enable ventilation, wherein respective second ends of the first breather hose and the second breather hose are connected to each other so as to enable ventilation. Consequently, the first ends of the first breather hose and the second breather hose are connected to the upper parts of the first tank and the second tank, respectively so as to enable ventilation, and the respective second ends of the first breather hose and the second breather hose are connected to each other so as to enable ventilation, so that it is possible to uniformize the pressure in the first tank and the pressure in the second tank.

A work vehicle according to a fifth aspect of the present invention includes: a supply member that has a supply opening extending and opened inside the second tank, and supplies the fuel stored in the second tank from the second tank to the internal combustion engine: and a hollow tube member having a first end connected to the second end of the piping member so as to enable the fuel to flow, and a second end extending in a direction away from the first tank, and having a hollow tube opening opened so as to enable the fuel to flow at a position further separated from the first tank than the supply opening. Consequently, the hollow tube member having the first end provided in the piping member, and having the hollow tube opening at the position further separated from the first tank than the supply opening in the second end extending in the direction away from the first tank is provided in the second tank, so that for example, when the rolling machine is inclined at the predetermined angle such that the first tank lowers in the gravity direction, even in a case where the fuel is biased to the side close to the first tank of the second tank, the fuel stored in the second tank is stored on the lower side in the gravity direction with respect to the hollow tube opening provided on the second end of the hollow tube member, and therefore the fuel can be supplied to the internal combustion engine from the second tank through the supply opening of the supply member regardless of the inclination angle of the rolling machine.

EXPLANATION OF REFERENCE SIGNS 1 vehicle body
2b second opening (opening)
2c protective plate (protective member)
10 drive device
12 engine (internal combustion engine)
20 cooling device
32 first tank
33, 133 piping member 34, 134 second tank
49 sucking-out part (supply member)
49a opening (supply opening)
50a first breather hose
50b second breather hose
160 first tubular member (hollow tube member)
162 opening (hollow tube opening)
164 second tubular member (hollow tube member)
166 opening (hollow tube opening)

The invention claimed is:

1. A work vehicle comprising:
a drive device that has an internal combustion engine for driving a vehicle body;
a first tank for storing fuel to be supplied to the internal combustion engine;
a second tank for storing fuel to be supplied to the internal combustion engine;
a lower panel disposed below the first tank and the second tank; and
a protective member detachably mounted on the lower panel, wherein
the first tank is disposed in front of or behind the drive device,
the second tank is disposed below the drive device so as to be separated from the first tank by a predetermined distance,
the lower panel is provided with an opening at a position corresponding to a portion between the first tank and the second tank, and
the protective member is mounted on the lower panel to close the opening.

2. The work vehicle according to claim 1, comprising a piping member having a first end connected to the first tank so as to enable the fuel to flow, and a second end connected to the second tank so as to enable the fuel to flow.

3. The work vehicle according to claim 2, the second tank comprises:
a supply member that has a supply opening extending and opened inside the second tank, and supplies the fuel stored in the second tank from the second tank to the internal combustion engine: and
a hollow tube member having a first end connected to the second end of the piping member so as to enable the fuel to flow, and a second end extending in a direction away from the first tank, and having a hollow tube opening opened so as to enable the fuel to flow at a position further separated from the first tank than the supply opening.

4. The work vehicle according to claim 1, comprising:
a first breather hose having a first end connected to an upper part of the first tank so as to enable ventilation; and
a second breather hose having a first end connected to an upper part of the second tank so as to enable ventilation, wherein
respective second ends of the first breather hose and the second breather hose are connected to each other so as to enable ventilation.

* * * * *